N. W. AKIMOFF.
METHOD OF AND APPARATUS FOR OBTAINING DYNAMIC BALANCE.
APPLICATION FILED JUNE 5, 1915. RENEWED JULY 6, 1918.
1,296,605.
Patented Mar. 11, 1919.
3 SHEETS—SHEET 1.
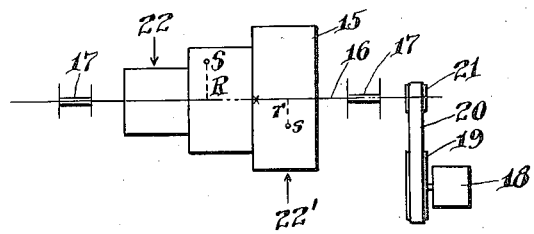
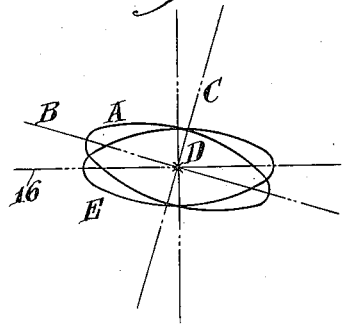
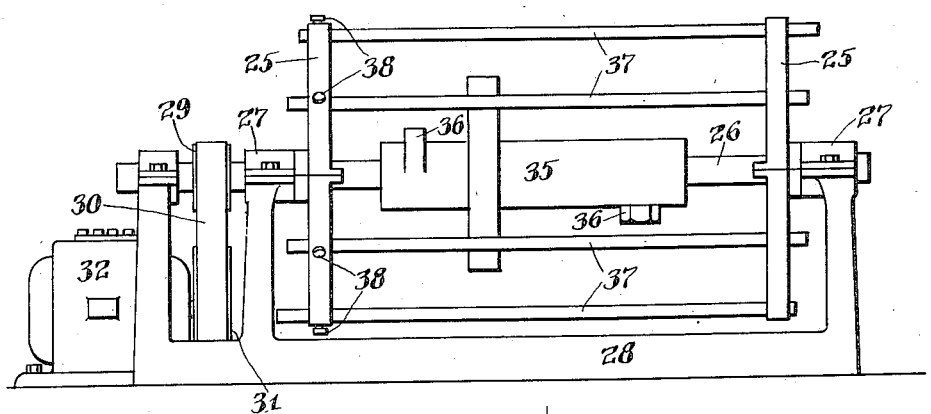
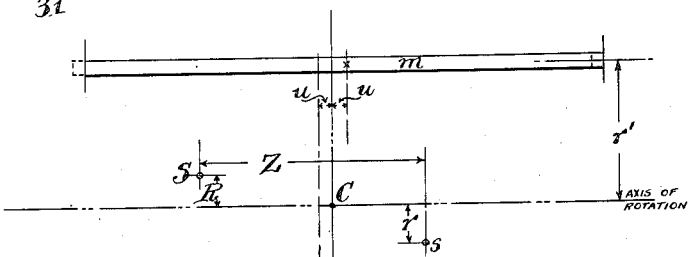
Witnesses
Inventor
Nicholas W. Akimoff,
By J. Stuart Freeman
Attorney N. W. AKIMOFF.
METHOD OF AND APPARATUS FOR OBTAINING DYNAMIC BALANCE.
APPLICATION FILED JUNE 5, 1915. RENEWED JULY 6, 1918.
1,296,605. Patented Mar. 11, 1919.
3 SHEETS—SHEET 2.
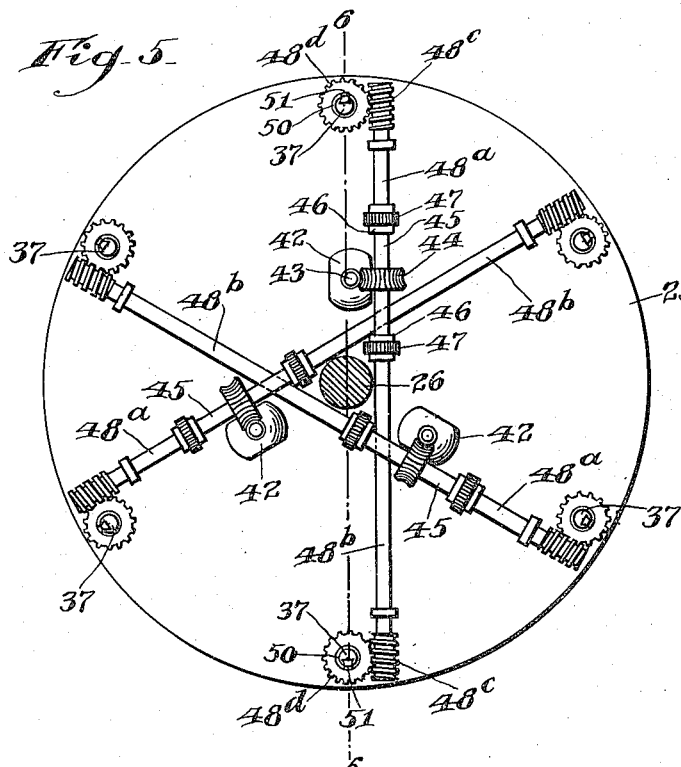
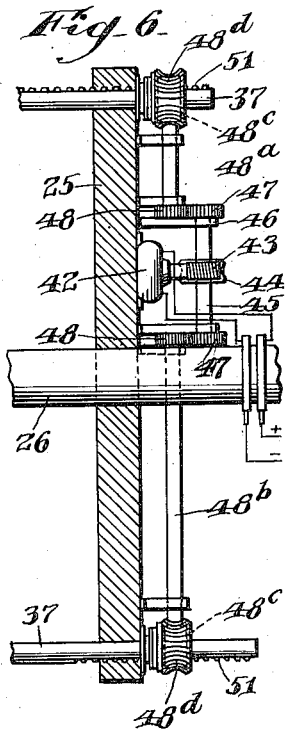
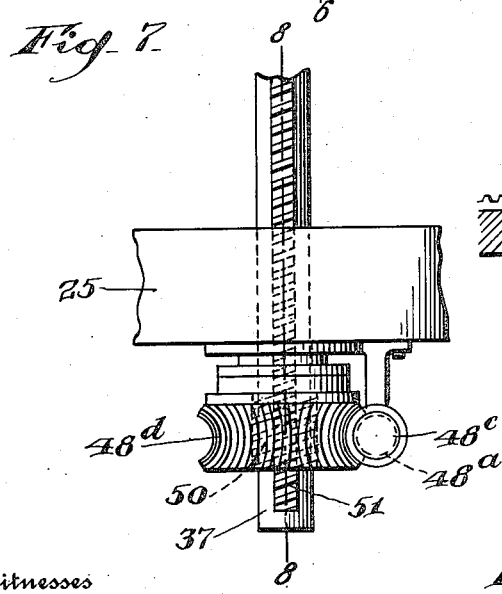
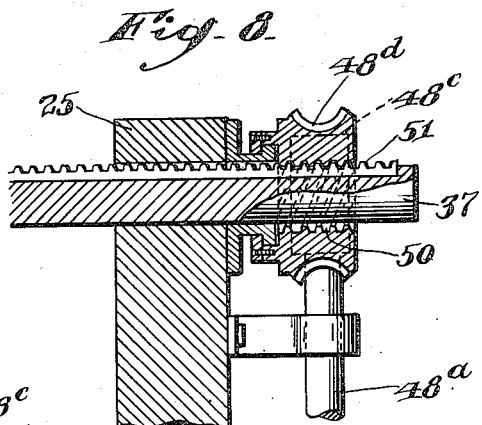
Witnesses
Inventor
Nicholas W. Akimoff,
By J. Stuart Freeman.
Attorney

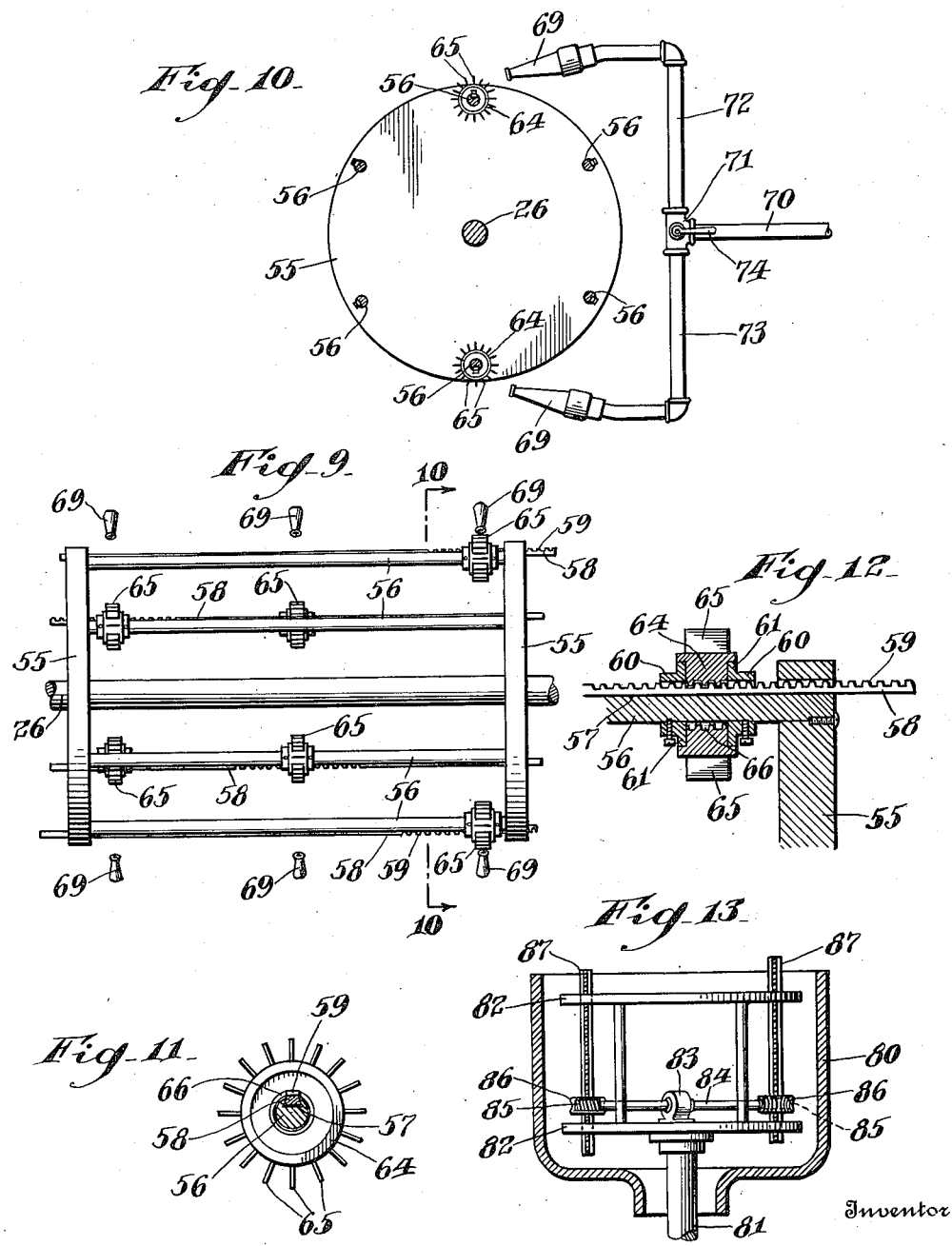

UNITED STATES PATENT OFFICE.

NICHOLAS W. AKIMOFF, OF PHILADELPHIA, PENNSYLVANIA, ASSIGNOR, BY MESNE ASSIGNMENTS, TO DYNAMIC BALANCING MACHINE COMPANY, OF PHILADELPHIA, PENNSYLVANIA.

METHOD OF AND APPARATUS FOR OBTAINING DYNAMIC BALANCE.

1,296,605.  Specification of Letters Patent.  Patented Mar. 11, 1919.

Application filed June 5, 1915. Serial No. 32,296. Renewed July 6, 1918. Serial No. 243,697.

*To all whom it may concern:*

Be it known that I, NICHOLAS W. AKIMOFF, a subject of the Czar of Russia, and a resident of the city of Philadelphia, county of Philadelphia, and State of Pennsylvania, U. S. A., have invented certain new and useful Improvements in Methods of and Apparatus for Obtaining Dynamic Balance, of which the following is a full, clear, and exact description.

In the mechanical arts there are innumerable instances of mechanisms, or parts thereof, which, even when made with the greatest care by skilled mechanics employing the most accurate methods known to science, exhibit a tendency to vibrate when rotated at high angular velocities. This is generally apparent to a greater or less degree in such objects as fly-wheels, crank shafts of internal combustion engines, and rotors of steam turbines, as well as in many forms of electrical apparatus, etc.

Practice, as well as theory, proves the absolute necessity of the existence of a perfect balance constantly maintained in rotatable bodies, designed for relatively high speeds, both while stationary and while revolving at high angular velocities. The condition of being balanced while standing is termed "static balance", and that while moving is known as "dynamic", or "running balance". The absence of a perfect dynamic balance causes a vibration of a rotating body, which vibration upon being communicated to the allied mechanisms, bearings, and foundations thereof, usually lessens the efficiency of the device, shortens its useful life, destroys the means employed to secure the device to its fundation, and upon not infrequent occasions prevents the installation of the affected mechanism, because of its certain effect upon neighboring bodies.

By "static balance" is expressed in a concise phrase a condition in which the center of gravity of a body lies somewhere upon the axis of rotation. This is readily obtained by the well-known method of placing the rotatable body upon knife edges, or parallels, then observing any pendular movement or oscillation, which may develop as a result of a lack of balance, and then removing material from the unduly heavy portion, or portions. The result obtained insures the coincidence of the center of gravity with the central axis of the body, which latter is in probably every instance analogous to the axis of rotation.

By the phrase "dynamic balance" there is implied the condition in which the center of gravity of a body lies upon its axis of rotation, as in the above case, but with the additional condition of the axis of rotation of the body being coincident with one of its principal axes of inertia or of its momental ellipsoid. Such an essential condition is by no means insured simultaneously with the acquirement of a perfect static balance, and in fact has heretofore been exceedingly difficult of attainment.

The object of the invention, therefore, is to provide a method, whereby the quantitative effect of the one or more causes, such as air holes, or superfluity of material, preventing a perfect dynamic balance of a rotating body, may be detected, their locations in angular direction and distance from the axis of rotation functionally determined, and by a simple calculation an absolute remedy developed.

Another object is to provide a simple mechanism, embodying a thoroughly practical adaptation or embodiment of the invention for universal employment in the mechanical arts, wherein rotating bodies of unlimited shape and size are employed and run at high speeds.

A further object is to provide a suitable mechanism, having one or more pairs of members parallel with, and adjustable longitudinally of, its axis of rotation, the entire mechanism possessing perfect dynamic balance when all of said members are in their respective neutral positions, and the said mechanism being adaptable of association with a dynamically unbalanced body, and operative by the shifting of said members to indicate the position and extent of the material causing the unbalanced condition of said body, and thus indirectly a relation between the amount of material necessary to be removed and the location at which said removal should take place to counteract or neutralize the cause of the body's unbalanced condition.

A still further object is to provide means, whereby the shifting of the elements of each pair of balancing members of the device is carried on independently of the remaining pairs, and while said device is revolving at high speed. This may be accomplished by electrically operated mechanisms, or through the agency of one or more fluid jets.

Additional objects and details of the construction and operation of the invention are fully brought out in the following description, when read in conjunction with the accompanying drawings in which, Figure 1 is a schematic view showing the usual method employed to determine the approximate location of the cause of a lack of dynamic balance in a rotatable member; Fig. 2 is a geometrical diagram, showing the relation between the major axis of the momental ellipsoid of inertia of a dynamically unbalanced body and the axis of rotation; Fig. 3 is an elevation of a simple mechanism comprising one embodiment of the invention; Fig. 4 is a diagrammatic figure showing the relation of the various factors encountered and employed to readily determine the proper position and amount of material necessary to be removed from the unbalanced body, to properly balance the same; Fig. 5 is a fragmentary sectional view of one end of the squirrel cage, showing weight controlling mechanisms mounted upon one of the end plates of the cage; Fig. 6 is an enlarged detail view of the same on the line 6—6 of Fig. 5; Fig. 7 is a fragmentary detail view of a portion of the same; Fig. 8 is a section on the line 8—8 of Fig. 7; Fig. 9 is an elevation of the squirrel cage with a modified form of weight-operating means mounted thereon. Fig. 10 is a section on the line 10—10 of Fig. 9; Fig. 11 is a detail of the weight-shifting fluid impact wheel; Fig. 12 is a section of the mounting of the same; and Fig. 13 is a modified form of the device applied to a rotatable hollow body carried by a vertical axis.

Referring to Fig. 1, a representative body 15 is shown, mounted to revolve at high angular velocities upon the axis of rotation 16, passing through bearings 17, adapted to yield slightly to vibrations in a horizontal plane, said body being driven by any suitable means, as by the motor 18, through the pulley 19, belt 20 and pulley 21. Mounted in suitable supports (not shown) is a set of scribes 22 and 22', located upon diametrically opposite sides of the body 15 and adjacent to the surface thereof, as indicated. Said scribes are carefully adjusted as the unbalanced body revolves, until the latter encounters one or both of them during a portion of each revolution, as it reciprocates in the yielding bearings 17, transversely to the axis of rotation. In this manner slight scratches are made upon the surface of the body showing so-called "high points", from which there can be judged something of the approximate position from which some material should be removed to properly balance the body dynamically. But this can in no way be made to indicate either the exact position from which said material should be removed, or the exact amount necessary to accomplish the desired result. Several trials are as a rule necessary and then only a partial success is obtained.

With a condition such as this case presents, it is readily possible to balance the body statically by means of resting the same mounted on its shaft upon parallels, or knife edges, and then removing material as proves to be necessary. Thus, for instance, a heavy spot may exist at S at a distance R from the axis of rotation on one side, and to counteract it a second heavy spot $s$ should exist at a distance $r$ upon the diametrically opposite side of said axis. This then insures perfect static balance while $S \times R$ equals $s \times r$. But this addition of compensating material being difficult, an equal amount may be removed from the same side of the axis of rotation as the heavy spot S. All that is necessary is to select the best available spot from which such material may be removed with safety to the resulting structure, measure the radial distance $r$ from the said axis, and solve the above equation for $s$. In this manner a perfect standing balance is insured, but it is no guarantee that there will not develop heavy vibrations as soon as the body is revolved at high speeds. Certain centrifugal forces will appear, which will cause an undue vibration of the whole system, and which can not be satisfactorily overcome by ordinary methods.

In Fig. 2 is shown graphically the conditions of unbalance and balance of a revolving body. In the first case, the ellipsoid of inertia A is symmetrical about major and minor axes B and C, which intersect at a point D, comprising the center of gravity of the body and marked with an "X" in Fig. 1. When the cause, or causes, of unbalance are removed and a state of perfect balance is attained, the ellipsoid swings about the point D, the one point that remains fixed, until it assumes the position E, in which position the axis B is coincident with the axis of rotation 16.

It is to be noted that, in rotating a body at high speed to determine whether or not it possesses a perfect balance, several simple devices of seismographic nature may be employed, and in this way the vibrations are recorded, though no factor of their cause is indicated. However, it should be stated that there are cases in which the disappearance of vibrations in a mechanism at a certain high speed does not indicate a perfect dynamic balance; there is a speed called the "critical speed" at which a body, even though lacking the desired balance, will rotate smoothly, which action is due to the periodic vibrations of its supports counteracting the vibrations of the body. This critical velocity can not confuse or mislead one, for the vibrations of the mechanism appear at the speed both above and below the same and in a given mechanism always disappear only at a definite critical value. However, a body, which is balanced for any speeds except the critical speed, is balanced for all speeds.

The simpliest embodiment of the invention is shown in Fig. 3, wherein two, or more, circular plate 25 are mounted securely upon a shaft 26, journaled in suitable rigid bearings 27, carried by a frame 28, said shaft being provided with a pulley 29 from which a belt 30 passes to a pulley 31 upon, or driven by, a motor 32. A rotatable body 35 is mounted upon the shaft 26 and made to revolve therewith, said body having irregular, unbalanced portions 36, while between the plates 25 and passing slidably therethrough is a plurality of rods or weights 37, which may be secured in any given longitudinal position parallel with the axis of rotation by means of set screws 38.

The plates 25 and longitudinally adjustable weights 37, when the latter are in their neutral positions and unassociated with an unbalanced body, form a perfectly balanced "squirrel cage", the major axis of its ellipsoid of inertia being coincident with its axis of rotation. And, it is evident that any displacement of the two diametrically situated rods in opposite directions shifts the major axis of the ellipsoid of inertia of the cage out of coincidence with its axis of rotation. For an explanation of this fact, reference is made to Fig. 4.

If in order to establish a perfect dynamic balance, it is necessary to displace each weight from its neutral position by the distance $u$, it can readily be inferred that the centrifugal couple thus created is $2umr'$; this was the displacement found to be necessary to counterbalance the original centrifugal couple, which caused an unbalanced condition of the system, comprising the balanced cage and unbalanced body within, due to the over dense regions S and $s$ in the material comprising the body.

The centrifugal couple due to the latter is $S \times R \times Z$, or $s \times r \times z$; S and $s$ being the masses, so far unknown, and SR being equal to $sr$ in view of the initial condition of static balance. Therefore, $2umr$ equals SRZ, whence can be readily determined either of the elements, by assuming for practical reasons, the remaining two—for instance, if it is preferred to drill in two opposite places S and $s$, Z inches apart, then, selecting the radius R, the amount to be removed at S is readily determined. And, inversely, material should be removed from points such as S and $s$ upon opposite sides of the axis, since RS equals $rs$, (from the hypothetical condition of a static balance), the solution of the problem presented becoming perfectly definite.

Inasmuch as the adjustment of the weights shown in Fig. 3 requires frequent starting and stopping of the system, which may be objectionable, the movable weights of the system have been provided with means to control or shift the same while in actual rapid motion, with the result that it is not necessary to stop the motion of the system until the correct positions of the balancing rods have been determined. This can be readily accomplished by such mechanism as that shown in Figs. 5 to 8, inclusive.

In this instance one of the plates 25 is provided preferably with electrically operated, reversible motors 42, in number sufficient to operate the respective pairs of oppositely situated rods or weights 37. Each of the shafts of said motors is provided with a worm wheel 43, which meshes with a worm gear 44, carried by a shaft 45, journaled in bearings 46, and provided in turn at its opposite ends with gears 47, operative to mesh with gears 48, carried by shafts $48^a$ and $48^b$, in turn provided with worms $48^c$, meshing with worm gears $48^d$.

Said worm gears $48^d$ are suitably mounted in a fixed position with respect to the neighboring plate 25 and are provided with central apertures 50, the surface of said apertures being spirally threaded and adapted to engage the teeth of racks 51, secured to and forming unitary parts of said rods or weights 37. The two worms $48^c$ carried by each of the shafts $48^a$ and $48^b$ are respectively right and left handed, so that, as a motor revolves in a given direction, the weights shifted thereby are moved in opposite directions through the end plates of the cage, and a reversal of said motor reverses the directions in which said plates are moved. By the constructions and relative positions of the various elements of the device as shown in Fig. 5, the dynamic balance of the structure is maintained.

Referring now to Figs. 9 to 12, inclusive, a modified form of the device is shown as comprising the end plates 55, connected by rods 56, fixed with respect thereto, and provided respectively with dove-tail grooves 57, in which are slidably mounted longitudinally movable weights 58, provided in turn with rack teeth 59. Surrounding and secured to each of said rods are spaced collars 60, having integral, radially extended flanges 61, the peripheral and adjacent surfaces of which form bearings for wheels 64, provided upon their outer surfaces with radially extending vanes 65 and upon the inner surfaces of their axial bores with spiral teeth 66, adapted to mesh with the teeth of said rack and operative thereby to oscillate the same in the said grooves 57 of the rods 56.

To actuate the weights, suitable nozzles 69 are provided, substantially as shown in Fig. 10, for the purpose of directing fluid jets against the vanes of said wheels 64, fluid being supplied to said nozzles from a suitable source under high pressure through the pipe 70, two-way valve 71, and pipes 72 and 73. For instance, to shift the upper weight away from, and the lower weight toward, the sheet, the valve handle 74 may be turned upwardly, permitting fluid to pass through the pipe 72 and adjacent nozzle to the oppositely positioned vane wheels, as they fly past upon the rapidly revolving cage. And, to reverse the movement of said weights, fluid is cut off from the pipe 72 and sent through the pipe 73 with the result desired, no fluid escaping through either of said nozzles when the valve handle is in the position shown.

As the great number of rotatable bodies is not limited to those having horizontal axes of rotation, as for instance cream separator bowls, or extractors which revolve upon vertical axes, Fig. 13 shows a simple adaptation of the invention to the balancing of such a body. In this case any representative bowl 80 is shown, as revoluble upon a vertical axis 81, which also carries spaced platforms 82, between which and upon one is located a suitable motor 83, or other actuating mechanism, operative to drive a shaft 84, provided with worms 85, in turn operative to mesh with and revolve worm wheels 86. The turning of said last-named wheels operates the vertically extending parallel rods or weights 87 as hereinbefore disclosed. While this last embodiment of the invention is but briefly described, it is intended to clearly show the efficient adaptation of the invention to rotatable bodies of this character, namely, those revoluble upon other than horizontal axes.

It has furthermore been shown that, with the embodiments of the invention hereinbefore described, it is possible, while the system is revolving rapidly, to readily and in a very short time, adjust the movable weights, show that the dynamic balance of the system is attained, after which the same may be stopped and the amount of material to be removed readily ascertained with both certainty and ease.

Having thus described my invention, what I claim and desire to protect by Letters Patent of the United States is:—

1. A system, rotatable about an axis fixed within said system, said system comprising a body provided with adjustable weights, means coöperating with said weights and adapted to adjust the same during the rotation of said system, to alter the position of the principal axis of inertia of said body relative to the direction of the axis of rotation of the system.

2. A system, rotatable about an axis fixed within said system, said system comprising a body provided with adjustable weights and adapted to be revolubly associated with a body to be tested, means coöperating with said weights and adapted to adjust the same, to alter the position of the principal axis of inertia of said first body relative to the direction of the axis of rotation of the system, to counterbalance the relative difference between the axis of inertia of said body to be tested and the axis of rotation of said system.

3. A system, rotatable about an axis fixed within said system, said system comprising a body provided with adjustable weights and adapted to be revolubly associated with a body to be tested, means coöperating with said weights and adapted to adjust the same, to alter the position of the principal axis of inertia of said first body relative to the direction of the axis of rotation of the system, to counterbalance the relative difference between the axis of inertia of said body to be tested and the axis of rotation of said system, and to make one of the principal axes of inertia of the system coincident with the axis of rotation of said system.

4. The combination of two bodies rotatable about a fixed axis passing through the centers of mass of said bodies, and adjustable weights carried by one of said bodies and operative to shift the principal axis of inertia thereof into coincidence with the axis of rotation of the system.

5. The combination of a body adapted to be revolubly associated with a body to be tested and the latter being rotatable about an axis passing through its center of mass, and adjustable weights carried by said first body and creating a centrifugal couple, operative to neutralize a centrifugal couple of said second body, said bodies being connected and having their centers of mass located upon the common axis of rotation.

6. The combination of a body adapted to be revolubly associated with a body to be tested and the latter being rotatable about an axis passing through its center of mass, and adjustable weights carried by said first body and creating a centrifugal couple, operative to neutralize a centrifugal couple of said second body.

7. The combination of a body adapted to be revolubly associated with a body to be tested and the latter being rotatable about an axis passing through its center of mass, and adjustable weights carried by said first body and creating a centrifugal couple, operative to neutralize a centrifugal couple of said second body, said bodies being connected and having their centers of mass located upon the common axis of rotation.

8. A dynamic balancing mechanism, comprising an adjustable system rotatable about an axis passing through its center of mass, and adjustable means forming a part of said system and operative to tilt the principal axis of inertia of the combination into coincidence with the axis of rotation while said system is rotating.

9. A dynamic balancing mechanism, comprising a dynamically perfectly balanced system adapted to be revolubly associated with a body to be tested, adjustable means operative to create an unbalanced condition of said system, to counteract and neutralize the extent of the unbalanced condition of said body to be tested, and means to control said adjustable means while said adjustable means is revolving.

10. In a dynamic balancing machine, a system comprising means adapted to receive a body to be tested, both said system and said body when in position being rotatable about a common axis passing through their respective centers of mass, weights movable in said system parallel with the axis of rotation thereof, and means operative to shift said weights while said machine is in operation.

11. In a dynamic balancing machine, a system comprising means adapted to receive a body to be tested, both said system and said body when in position being rotatable about a common axis passing through their respective centers of mass, pairs of weights movable in opposite directions in said system with respect to the center of mass of said system and parallel with the axis of rotation thereof, and means operative to shift said weights while said machine is in operation.

12. A dynamic balancing device, comprising a revoluble squirrel cage frame, the longitudinal bars of which are independently adjustable and means to move said bars while said frame is in motion.

13. A dynamic balancing device, consisting of a revoluble frame, comprising oppositely disposed members, parallel, independently adjustable members extending therebetween, and means to adjust said last-named members while said frame is revolving.

14. A dynamic balancing device, comprising spaced parallel plates, and spaced parallel bars extending between said plates movable independently of one another and means to affect a shifting of said bars with respect to said plates while the same are revolving.

15. A dynamic balancing device, comprising spaced parallel plates, spaced parallel bars passing slidably through, and extending between the peripheral portions of said plates and movable independently of one another, and means to simultaneously adjust a plurality of said bars while the device is revolving.

16. A dynamic balancing device, comprising spaced, parallel, centrally apertured plates, a shaft passing through said apertures, equally spaced parallel bars extending between said plates, longitudinally adjustable with respect thereto, and independently of one another, and means to shift said bars longitudinally while the device is in motion.

17. In a device for obtaining dynamic balance, a squirrel cage frame, having longitudinally adjustable parallel bars, a shaft upon which said frame revolves, and means to adjust said bars while said frame and shaft are revolving.

18. In a device for obtaining dynamic balance, a shaft, spaced parallel plates upon said shaft, spaced parallel bars passing slidably through said plates, and means coupling the diametrically opposite of said bars in pairs, and operative to adjust the longitudinal positions of the bars in each of said respective pairs simultaneously.

19. In a device for obtaining dynamic balance, a shaft, spaced parallel plates upon said shaft, spaced parallel bars slidably through said plates, and electrically operated means carried by said plates and operative to simultaneously adjust the bars in each of the respective pairs of diametrically opposite bars in opposite directions.

20. The method which consists in associating a dynamically unbalanced body with a body adapted to be perfectly balanced dynamically so that the two may be revolved synchronously, thus forming a dynamically unbalanced system, and then unbalancing said last-named body while said system is in motion, to neutralize the unbalanced condition of said first body to balance said system.

21. The method which consists in associating a dynamically unbalanced body with a body adapted to be perfectly balanced dynamically and operative to indicate the condition of dynamic balance of the system thus formed, so that the two may be revolved synchronously, then unbalancing said second body to neutralize the unbalanced condition of said first body, to balance the system while the same is rotating, and finally removing material from regions of said first body in ratios of positions and amounts as indicated by said second body.

22. In a dynamic balancing machine, a system comprising means adapted to be associated with a body to be tested, means whereby both said system and said body are adapted for rotation about a common axis passing through their respective centers of mass, said system comprising weights movable therein parallel with the axis of rotation thereof, and electrically operated means operative to shift said weights while said system is in rotation.

23. In a dynamic balancing machine, a system comprising means adapted to be associated with a body to be tested, means whereby both said system and said body are adapted for rotation about a common axis passing through their respective centers of mass, said system comprising pairs of weights movable therein parallel with the axis of rotation thereof and in opposite directions, and electrically operated means operative to shift said weights while said system is in rotation.

24. In a dynamic balancing machine, a system comprising means adapted to be associated with a body to be tested, means whereby both said system and said body are adapted for rotation about a common axis passing through their respective centers of mass, said system comprising weights movable therein parallel with the axis of rotation thereof, and means operative to shift said weights while said system is in rotation.

25. In a dynamic balancing machine, a system comprising means adapted to be associated with a body to be tested, means whereby both said system and said body are adapted for rotation about a common axis passing through their respective centers of mass, said system comprising pairs of weights movable therein parallel with the axis of rotation thereof and in opposite directions, and means operative to shift said weights while said system is in rotation.

26. A mechanism for testing a body as to its dynamic balance, said mechanism comprising a structure adapted to rotatably hold a body to be tested, means for mounting said structure to rotate upon an axis concentric with said body, said structure including adjustable means for altering the momental ellipsoid of the system consisting of said structure and said body, and means for effecting said adjustment during the rotation of said system.

27. A mechanism for testing a body as to its dynamic balance, said mechanism comprising a structure adapted to be rotatably associated with a body to be tested, means for mounting said structure to rotate upon an axis in a plane with the axis of said body, said structure including adjustable means for altering the momental ellipsoid of the system consisting of said structure and said body, and means for effecting said adjustment during the rotation of said system.

28. The method which consists in revolubly associating so as to form a rotatable system, a dynamically unbalanced body with a body capable of being adjusted to possess perfect balance, and operative to indicate the condition of balance of the system thus formed, and then unbalancing said last-named body while said system is in motion to neutralize the unbalanced condition of said first body and to balance the system.

29. A dynamic balancing machine, comprising the combination of a set of weights, means operative to support said weights, and means to revolve said supporting means and to rotate said weights in parallel planes, and means to move said weights to cause their planes of rotation to move with respect to one another longitudinally of the axis of said supporting means.

30. A dynamic balancing machine, comprising the combination of a set of weights, means operative to support said weights, and means to revolve said supporting means and to rotate said weights in parallel planes, and means to move said weights to cause their planes of rotation to move with respect to one another longitudinally of the axis of said supporting means while said weights are in motion.

31. A dynamic balancing machine, comprising the combination of a pair of weights, means operative to support said weights, means to revolve said supporting means and to rotate said weights in parallel planes about the axis of revolution of said supporting means, and means operative to alter the relative positions of said the weights so as to shift said parallel planes with respect to each other and longitudinally of said axis.

32. A dynamic balancing machine, comprising the combination of a plurality of pairs of weights, means operative to support said weights, means to revolve said supporting means and to rotate said weights in parallel planes about the axis of said supporting means, and means to alter the relative positions of the weights so as to shift said planes of revolution of the respective weights of each of said pairs while said supporting means and weights are in motion.

33. The method which consists in mechanically associating a dynamically unbalanced body with a body adapted to be perfectly balanced and unbalanced dynamically at will so that each tends to oppose the tendency of the other to vibrate if unbalanced and so that the two may be revolved synchronously, thus forming a dynamically unbalanced system, and then unbalancing said last-named body to neutralize the unbalanced condition of said first body to balance said system.

34. A dynamic balancing machine, comprising a support for a body to be tested, and a balancing unit connected to and revoluble in synchronism with said support and consisting of a plurality of equal weights revoluble in parallel planes movable with respect to each other.

35. A dynamic balancing machine, comprising a support for a body to be tested, and a balancing unit connected to and revoluble in synchronism with said support and consisting of a plurality of equal weights revoluble in parallel planes movable with respect to each other while said weights are in motion.

36. A mechanism for testing a body as to its dynamic balance, said mechanism comprising a structure adapted to rotatably support a body to be tested, means for mounting a second structure to rotate upon an axis concentric with said body and adjustable longitudinally with respect to said first structure, said structures including means equal in weight for altering the momental ellipsoid of inertia of the system consisting of said structures and said body, and means for effecting said adjustment during the rotation of said system.

37. The method which consists in mechanically associating a dynamically unbalanced body with a body adapted to be perfectly balanced and unbalanced dynamically at will so that the two may be revolved synchronously, and so that, when so revolved, each tends to oppose the tendency of the other to vibrate if unbalanced, thus forming a dynamically unbalanced system, revolving said system to determine its degree of unbalance and then unbalancing said last-named body to neutralize the unbalanced condition of said first body to balance said system.

In witness whereof, I have hereunto set my hand this 4th day of June, 1915.

NICHOLAS W. AKIMOFF.

Witnesses:
N. O. FREEMAN,
J. STUART FREEMAN.